United States Patent [19]
Nobutoki et al.

[11] 4,031,551
[45] June 21, 1977

[54] IMAGE PICKUP DEVICE

[75] Inventors: Saburo Nobutoki, Mobara; Chihaya Ogusu; Masao Sugimoto, both of Tokyo, all of Japan

[73] Assignees: Hitachi, Ltd.; Nippon Hoso Kyokai, both of Japan

[22] Filed: Mar. 19, 1976

[21] Appl. No.: 668,401

[30] Foreign Application Priority Data

Mar. 22, 1975 Japan .............................. 50-33541

[52] U.S. Cl. .............................................. 358/223
[51] Int. Cl.² ........................................... H04N 5/21
[58] Field of Search ....... 178/7.2, DIG. 42, DIG. 2; 358/41, 223

[56] References Cited
UNITED STATES PATENTS

| | | | |
|---|---|---|---|
| 3,590,145 | 6/1971 | Scheider et al. | 178/DIG. 42 |
| 3,610,818 | 10/1971 | Bachmann | 178/DIG. 42 |
| 3,767,846 | 10/1973 | Okubo | 178/DIG. 42 |

FOREIGN PATENTS OR APPLICATIONS

| | | | |
|---|---|---|---|
| 1,240,468 | 7/1971 | United Kingdom | 178/DIG. 42 |

Primary Examiner—Robert L. Richardson
Attorney, Agent, or Firm—Craig & Antonelli

[57] ABSTRACT

This specification discloses an improvement in an image pickup device incorporating therein an optical system which reduces the delay of the photoelectric signal by separately adding bias light to the light from an object. The improvement is characterized in that the bias light is introduced through that portion of the face plate which makes no contribution to image pickup.

10 Claims, 5 Drawing Figures

IMAGE PICKUP DEVICE

FIELD OF THE INVENTION

This invention relates to a television image pickup device and more particularly to an image pickup device in which the delay of a photoelectric signal is reduced.

DESCRIPTION OF THE PRIOR ART

Figure 1:
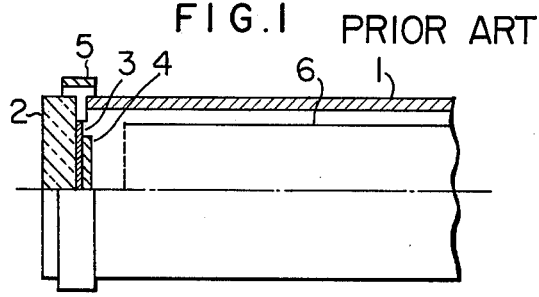
FIG. 1 schematically shows a conventional image pickup lens.

The basic structure of a conventional image pickup tube is as shown in FIG. 1. In FIG. 1, envelope 1 has at its end a face plate 2, and a transparent conductive film 3 and a photoconductive film 4 are laid on the inner surface of the face plate 2. The transparent conductive film 3 is electrically connected with a signal electrode 5. An electron gun 6 is arranged, in the envelope 1, opposite to the face plate 2. The electron gun 6 comprises a cathode, control electrodes, accelerating electrodes and focusing electrodes (all these components are not shown). Reflection coils (not shown) are provided around the envelope 1.

With this structure, the light emanating from an object and impinging upon the face plate 2 gives rise to a corresponding charge pattern in the photoconducting film 4. The electron beam from the electron gun 6 scans the photoconducting film 4 so that the charging and discharging in accordance with the charge pattern takes place to deliver a photoelectric signal at the signal electrode 5. Here, in order to reproduce the image of an object with high fidelity, the delays in the rise and fall times must be as short as possible. It should here be noted that the delay in the rise time is the interval of time from the instant that the light from the object falls upon the face plate 2 to the instant that the photoelectric signal owing to the incident light is generated and that the delay in the fall time is the duration from the moment the incident light is interrupted to the moment the photoelectric signal due to the incident light vanishes. The cause of such delays will be described with the aid of FIG. 2.

Figure 2:
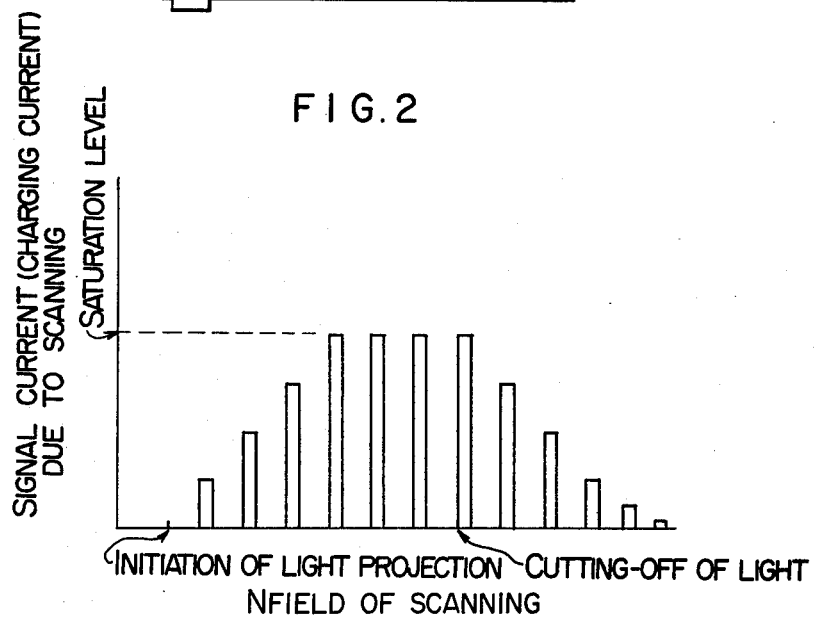
FIG. 2 is a diagram for explaining the delays in the rise and fall times of the photoelectric signal.

FIG. 2 is a diagram for explaining the delays in the rise and fall times of the photoelectric signal.

Photoconductive image pickup tubes (vidicon, saticon, plumbicon) are charge storing type image pickup tubes. When the beam-side surface of the photoconductive layer is initially scanned by the electron beam, the surface is charged. If light falls upon the photoconductive layer, the charges are released due to the photoconductive phenomenon, i.e. the reduction of the electric resistance of the layer, so that the potential of the photoconductive layer approaches that of the signal electrode. After that the photoconductive layer is recharged by the next scanning and the recharging current is used as the photoelectric signal.

It is assumed that the light from the object falls upon the photoconductive layer after the first scanning. Unless the resistance of the photoconductive layer is reduced to the saturated value corresponding to the irradiating light (the value of resistance assumed when the layer is exposed to the very same light for sufficiently long time) by the time of the next scanning, the next scanning cannot produce the proper quantity of charging current with respect to the projected light. Namely, the actual signal current is short of the standard level. After several scanning operations, the resistance of the photoconductive film gradually decreases and the charging current accordingly increases until it reaches a saturated value. After the saturation level is reached, the charging current at each scanning operation remains the same so long as the intensity of irradiating light is maintained the same. Now, if the light is cut off with the resistance value saturated, the immediately following scanning will produce the saturated charging current and the next following scanning also causes some charging current. This means that a single scanning after the irradiating light is cut off cannot bring the potential of the photoconductive film to the level attained when there is no light input. With the following scanning operations, the charging current decreases. The delays in the rise and fall times are usually expressed by the time, in terms of scanning number, until the saturation level is reached. Namely, if the scanning of the predetermined $n$-th field after the change of the incident light causes the charging current to attain a certain A% of its saturation level, the delay is said "A% after $n$-th field".

Of the photoconductive image pickup tubes, a plumbicon (trade name) using PbO as a main component of photoconductive layer and a saticon (trade name) having its photoconductive layer composed mainly of Se, As, Te, have an excellent image pickup quality and are used for broadcasting cameras. However, these tubes also have a certain length of delay in rise or fall time, which delay adversely affects the reproduction of the original picture with high-fidelity. It should here be noted that the smaller is the level of the photoelectric signal current in the absence of the light from the object, the longer is the delay in the rise or fall time. Therefore, in order to reproduce pictures with high-fidelity, the dark current level of the photoelectric signal current is increased by using a bias lighting system which adds uniform light to the light from the object. The resultant photoelectric signal current contains a component due to the bias light and the correct television signal is obtained by extracting this component from the composite signal.

Figure 3:
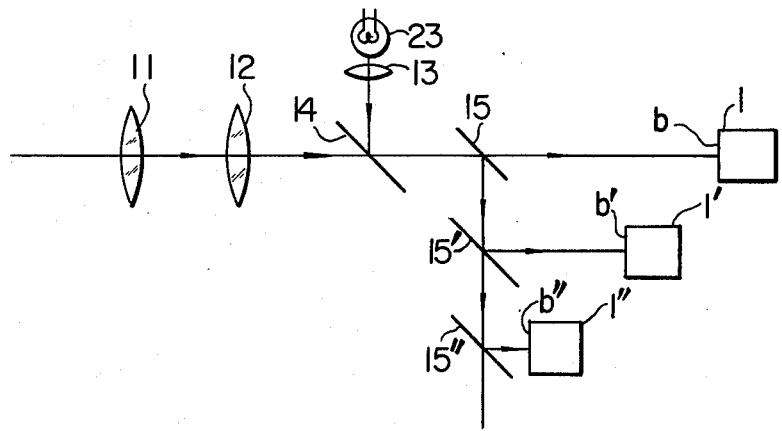
FIG. 3 schematically shows the optical system with a bias lighting mechanism, used in a conventional image pickup device.

The conventional optical system for synthesizing the light from the object and the bias light has the following structure as shown in FIG. 3. Namely, in case of a three-tube color TV camera, the structure is that which performs color separation by the use of dichroic mirrors.

In FIG. 3 are shown lenses 11 and 12 for converging the light from an object, a lens 13 for focussing the light from a bias light source 23 of a bias lighting system, a beam splitting half mirror 14, dichroic mirrors 15, 15' and 15", and image pickup tubes 1, 1' and 1" with their respective face plates $b$, $b'$ and $b''$. In general, the distance between the lens 12 and each of the face plates is rather long. By interposing a beam splitting half mirror 14 which reflects the light from the source 23 and casts it as a bias light upon the effective image pickup surface of the face plate, the light from the object and the bias light are synthesized. In a TV camera which is most currently in the market, however, the distance between the flange for mounting the lens for converging the light from the object and the surface of the face plate is only several millimeters and therefore it is very difficult to place such a bias light introducing means as beam splitting half mirror in the small gap. Another method for introducing bias light is to conduct the light generated by the filament for heating the cathode to the beam-side surface of the photoconductive film. However, the image pickup tube fabricated on the basis of this method must be provided with a special light conducting means. This gives rise to a drawback in respect of production control and cost.

SUMMARY OF THE INVENTION

One object of this invention is to provide an image pickup device having an optical system which adds bias light to the light from an object so as to shorten the delays in the rise and fall times of the photoelectric signal generated by the light from the object.

Another object of this invention is to provide an optical system which can supply bias light even for the image pickup device wherein the distance between the lens mounting flange and the face plate is only several millimeters and which is free from drawbacks in respect of production control and cost.

According to this invention, which has been made to attain the above objects, the peripheral portion of the face plate, ineffective for image pickup is used as a dispersive light source for feeding bias light. This invention will be described in detail by way of various exemplary embodiments.

DESCRIPTION OF THE PREFERRED EMBODIMENTS

Figure 4:
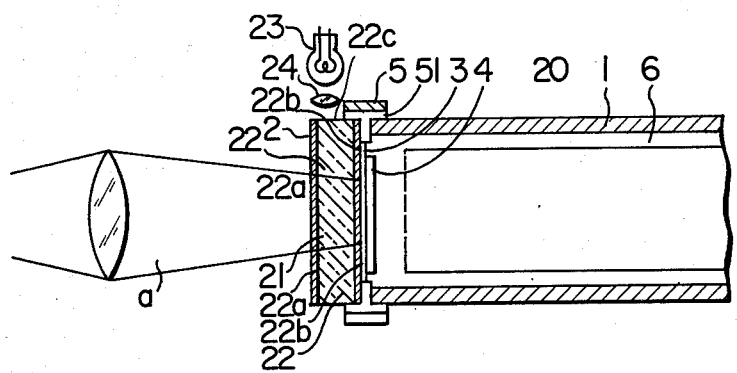
FIGS. 4 and 5 schematically show image pickup devices as embodiment of this invention.

FIG. 4 shows an image pickup device as a first embodiment of this invention. Throughout the figures, the equivalent parts or elements are indicated by the same reference symbols. As seen in FIG. 4, a pickup tube 20 has its face plate 2 exposed and nearer to the convergence lens than a signal electrode 5 and a conductive hermetical sealing 51. The peripheral portion of this face plate 2 provides no contribution to image pickup and is hereafter referred to as the "ineffective periphery". Only the central portion 21 of the face plate is used as an effective image pickup surface. The ineffective periphery needs no such optical characteristics as distortionless transmittivity of light, that is, the ineffective periphery need not have a plain surface and need not be permeable to light. According to this invention, at least one of the surfaces 22a, 22b and 22c of the ineffective periphery 22 of the face plate 2 or at least a portion of one of the surfaces, is either polished by polishing sand to make the surface or the portion thereof rough or made light-dispersive by applying powder of TiO$_2$ or ZnO into the surface or the portion thereof. In case of powder application, a binder having a refractive index largely different from that of TiO$_2$ or ZnO may be used to improve the degree of dispersion. Even if a binder having the same refractive index is used, the fine particles of the powder in the binder film produce a rough surface to sufficiently disperse light. A light source 23 such as a small lamp is disposed near the side surface 22c of the face plate 2 and the light from the source 23 is introduced through a lens 24 and the surface 22c into the central portion, i.e. effective area 21 of the face plate 2. Accordingly, the introduced light is dispersed by the surfaces 22a, 22b and 22c of the ineffective periphery 22 and is uniformly supplied as bias light to the effective area 21 of the face plate 2.

Figure 5:
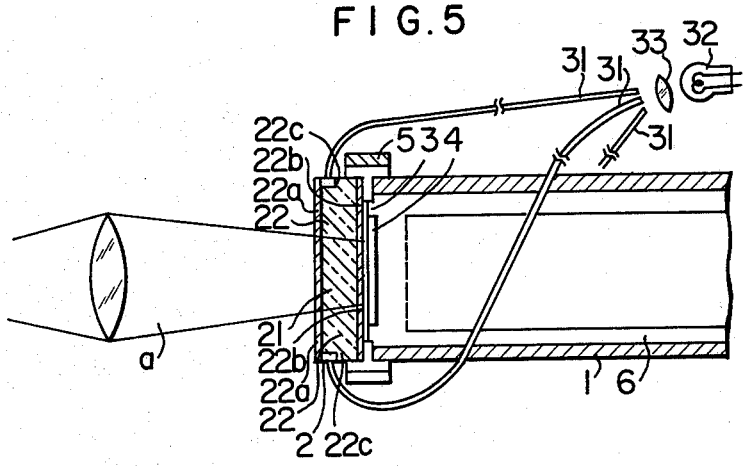

FIG. 5 shows an image pickup device which is a second embodiment of this invention and which is an improved version of the first embodiment described above. In FIG. 5, light-conductive pipes 31 such as optical fibers are attached at one end to the surface 22c of the face plate 2. The pipes 31 serve to conduct to the surface 22c of the face plate 2 the light emitted by a light source 32 such as a small lamp placed remote from the signal electrode 5 and converged by a lens 33. The reason why the light source 32 is placed remote from the signal electrode by virtue of the light-conducting pipes 31, is as follows. For one thing, if a light source such as a small lamp is disposed near the side surface 22c as shown in FIG. 4, the light source tends to pickup the inductive noise which covers the frequency range of 6 – 10 MHz due to the leakage electric field by synchronizing signal or deflection signal, etc. Thus, as a result of the inductive coupling between the wiring for the light source and the signal electrode 5, the video signal is contaminated by the inductive spurious signal. This spurious signal can be eliminated by simply placing the light source remote from the adverse inductive sources. And secondly, the side surface 22c occupies a small area so that a light source can hardly be located directly on the surface.

With the structure described above, the light conducted from the light source 32 by the light-conducting pipe 31 is uniformly projected into the effective area 21 of the face plate 2 to provide a uniform bias light. Accordingly, the delays in the rise and fall times of the photoelectric signal are considerably shortened.

As described above, according to this invention, the optical system to provide bias light is easy to fabricate and has an improved reliability in comparison with the conventional optical system described in the section of PRIOR ART. In addition to this, according to this invention, a light source 32 for bias-lighting is separately provided so that the illumination of the bias light is easily controlled by simply adjusting the intensity of the light source 32. Accordingly, the resultant image pickup device can find a much broader use than the conventional one and therefore enjoy advantages in respect of production control and cost. Moreover, the use of the light-conductive pipes 31 enables the light source 32 to be remote from the signal electrode 5 so that the video signal can be prevented from being mixed with the spurious signal and that the influence upon the face plate of the heat radiation from the light source 32 can be prevented. Further, the position of the light source 32 is optional so that the fabrication of the optical system is facilitated.

It has been revealed as a result of experiments that if light-conductive pipes 31 (for example, 3) are used and if the illumination at the side surface of the face plate is kept to be 1 lux, then a desirable result can be obtained. The method for maintaining the illumination on the effective area 21 uniform is to adjust the positions where the pipes 31 are attached to the face plate 2 or to adjust the degree of light dispersion in the surfaces 22a, 22b and 22c of the ineffective periphery by blackening the predetermined portion of the ineffective periphery 22 of the face plate, by cutting notches therein or by sticking another thin face plate having an uneven surface on the face plate 2.

In the previous description, the surfaces 22a, 22b and 22c of the ineffective periphery 22 of the face plate 2 are light-dispersive surfaces which are at least partially made rough or have a light-dispersive paint applied thereto. However, if the component of the incident light *a* from the object is reflected by the photoelectric transducing surface of the layer 4, reaches the surface 22*a* and at least 3% of incident light are again reflected by the surface 22*a*, then the last reflected light may adversely affect the video signal. Therefore, it is also necessary to make the portion the surface 22*a* where the component of the incident light *a* from the object is reflected by the photoelectric transducing surface of the layer 4 non-dispersive. After all, the degree of light dispersion of the surface 22*a* should be determined in such a manner that the light from the bias light source is sufficiently dispersed by the surface 22*a* and projected into the effective area 21 and that the further reflection of the reflected light by the surface 22*a* is appropriately prevented.

Each of the light-conductive pipes 31 may be composed of plural elements. Also, the pipes 31, if their diameters are rendered very small, may be attached on the surface 22*a* of the ineffective periphery 22, sent through the very small space between the lens mounting flange and the face plate 2, to introduce the bias light through the surface 22*a*. Moreover, the bias light may be introduced through both the surfaces 22*a* and 22*c* or through any other suitable areas. The pipes 31 need not necessarily be fixed to the surface 22*a* or 22*c* but have only be disposed in contact with it if the bias light is effectively introduced.

Further, more than one light source may be used for bias lighting.

As described above, according to this invention, the structure of the optical system for providing bias light for an image pickup tube is facilitated so that the optical system is easy to fabricate, of universal purpose, advantageous in respect of production control and cost, and of high reliability.

We claim:
1. An image pickup device having a photoconductive type image pickup tube comprising:
   a. a face plate disposed at one end of an envelope and consisting of an effective image pickup region at the central portion thereof and an ineffective image pickup region at the peripheral portion thereof including the edge of the face plate, at least a portion of said ineffective image pickup region being light-dispersive; and
   b. means including at least one light source for introducing light solely into said light-dispersive portion of said ineffective image pickup region, said introduced light being dispersed by said portion and projected as bias light into said effective image pickup region.

2. An image pickup device as claimed in claim 1, wherein said light from said light source is introduced through a point of said light-dispersive portion of said ineffective image pickup region formed on the edge of said face plate.

3. An image pickup device as claimed in claim 1, wherein said light source is located outside said envelope.

4. An image pickup device as claimed in claim 1, further comprising
   c. a transparent electrode disposed on the inner surface of said face plate;
   d. a photoconductive film disposed on said transparent electrode;
   e. a signal electrode electrically connected with said transparent electrode,
   f. an electron gun disposed in said envelope, opposite to said face plate; and
   g. a conductive hermetic sealing member connected electrically with said transparent electrode hermetically sealing said envelope and coupled to said signal electrode.

5. An image pickup device as claimed in claim 1, wherein at least a portion of said ineffective image pickup region is made rough.

6. An image pickup device as claimed in claim 1, wherein at least a portion of said ineffective image pickup region has a light-dispersive paint applied thereto.

7. An image pickup device as claimed in claim 1, wherein said light introducing means further comprises at least a light-conductive pipe having one end communicating with said light source and the other end in contact with said light-dispersive portion of said ineffective image pickup region.

8. An image pickup device as claimed in claim 7, wherein one end of said light-conductive pipe is disposed at the outer surface of said face plate at the edge thereof.

9. An image pickup device as claimed in claim 1, wherein at least a portion of said light-dispersive area of said ineffective image pickup region is blackened.

10. An image pickup device as claimed in claim 1, wherein at least a portion of said light-dispersive area of said ineffective image pickup region is made uneven.

* * * * *